Dec. 9, 1930. J. S. KROB 1,784,693
SAUSAGE CASING MACHINE
Filed May 25, 1928 2 Sheets-Sheet 1
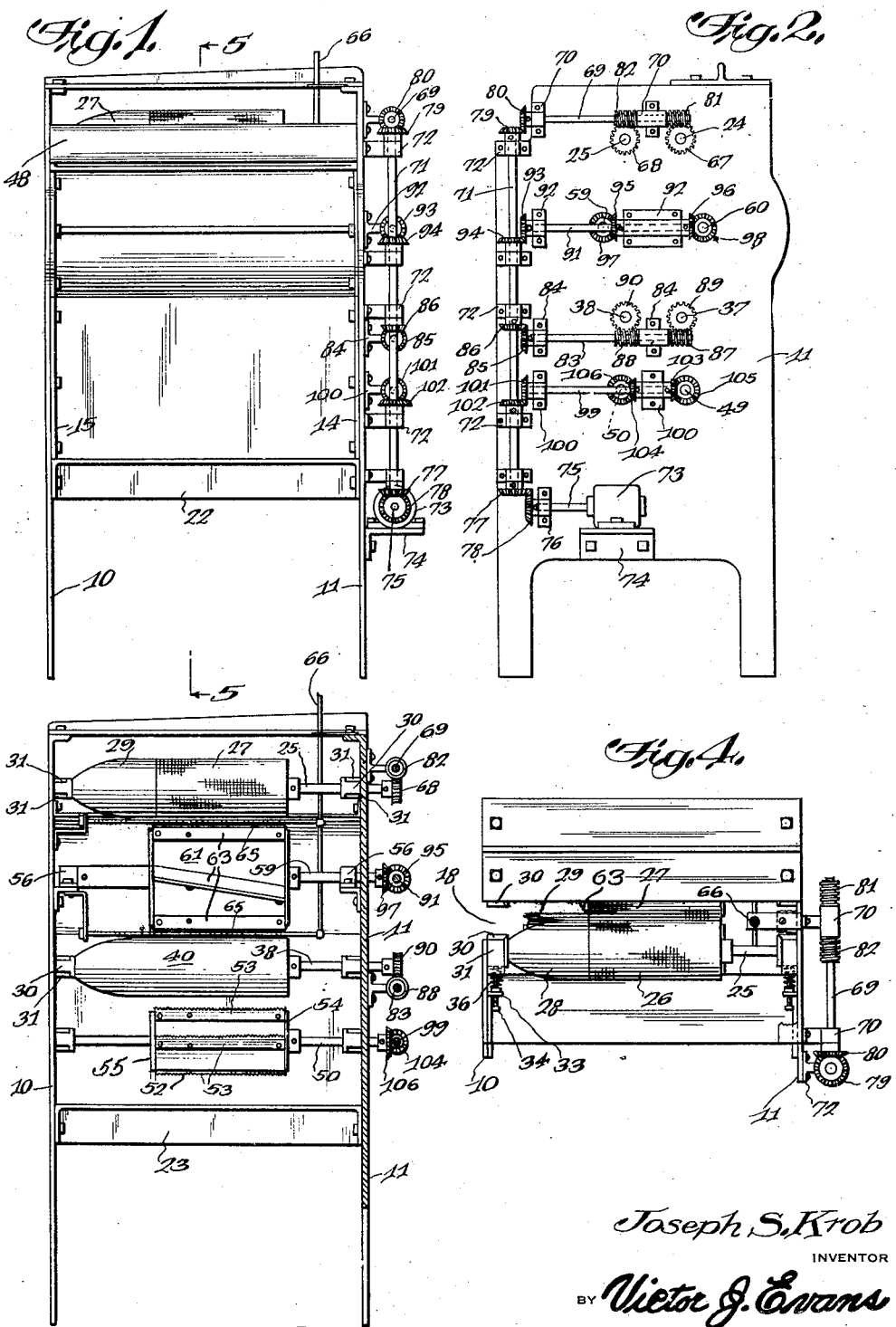
Joseph S. Krob
INVENTOR
BY Victor J. Evans
ATTORNEY Dec. 9, 1930. J. S. KROB 1,784,693
SAUSAGE CASING MACHINE
Filed May 25, 1928   2 Sheets-Sheet 2

Joseph S. Krob
INVENTOR
BY Victor J. Evans
ATTORNEY

Patented Dec. 9, 1930

1,784,693

UNITED STATES PATENT OFFICE

JOSEPH S. KROB, OF CHICAGO, ILLINOIS

SAUSAGE-CASING MACHINE

Application filed May 25, 1928. Serial No. 280,595.

This invention relates to certain novel improvements in sausage casing cleaning machines and has for its principal object the provision of an improved construction which will be highly efficient in use and economical in manufacture.

The specific object of the invention is to provide a device of the above named character which may be employed for removing fat substances from the outer surface of beef intestines such as are used for sausage casings.

Another object of the invention is to arrange a device of the above named character in such a manner that the sausage casing may be squeezed or otherwise acted on so as to loosen the fat to permit the cleaning knives to expeditiously remove it.

A further object of the invention is to arrange a device such that the casing may be subjected to a stream of hot water which will aid in the cleaning action.

A still further object of the invention is to arrange a device of the above mentioned character in such a manner that the cleaning and scraping elements may be expeditiously removed when so desired.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a front elevational view of a preferred form of construction for my invention;

Fig. 2 is an end elevational view looking in at the right-hand end of the device as illustrated in Fig. 1;

Fig. 3 is a view looking in the same direction as Fig. 1, the guard plates having been removed;

Fig. 4 is a top plan view;

Figures 5, 6, 7:
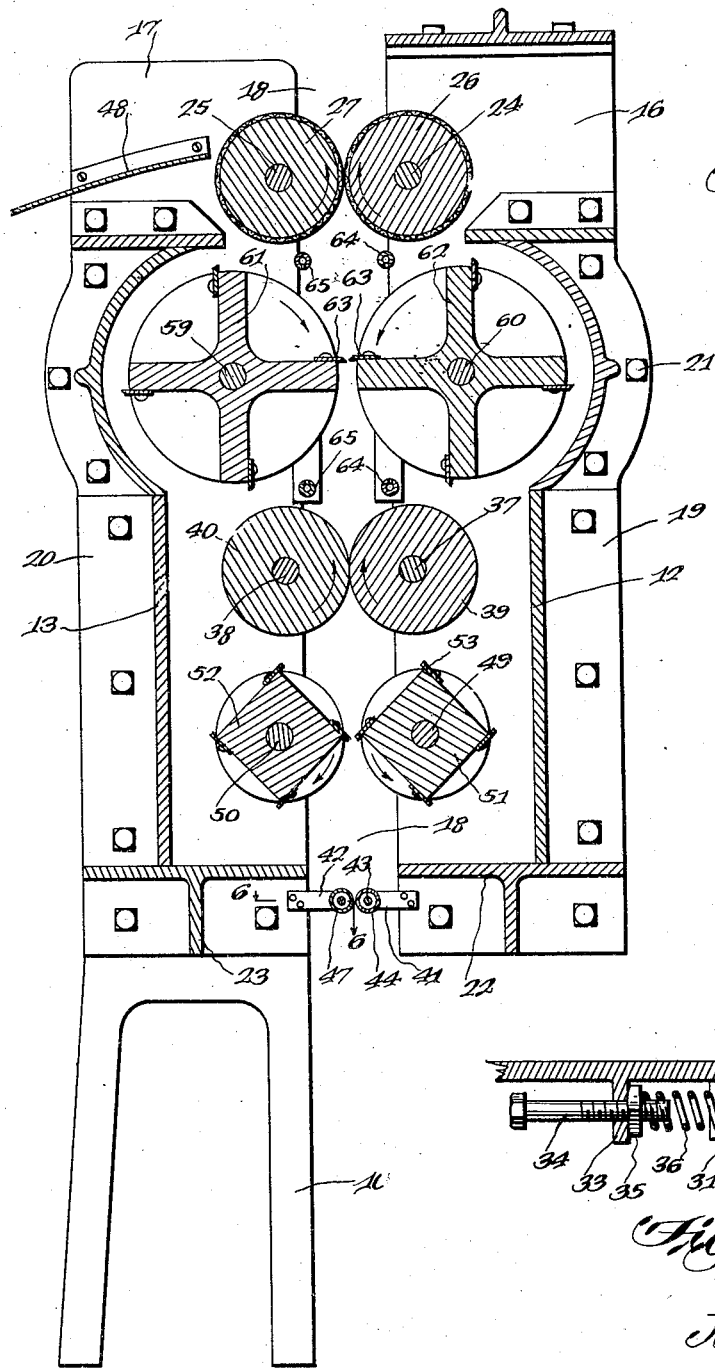
Fig. 5 is a vertical sectional view taken substantially on the line 5—5 on Fig. 1.
Fig. 6 is a fragmental detail view taken substantially on the line 6—6 on Fig. 5.
Fig. 7 is a fragmental detail view depicting the construction employed for tensioning the guiding and crushing rollers.

In the drawings wherein I have illustrated the preferred embodiment of my invention 10 indicates the base construction which supports my improved device. Extending up from the base construction is a wall 11 which extends across the device. The side walls 12 and 13 in my improved device embody flanges 14 and 15 which are secured to the wall 11. Arranged opposite the wall 11 are two wall sections 16 and 17 which are spaced apart so as to provide a slot 18 therebetween. The side walls 12 and 13 include flanges 19 and 20 which are secured to the end walls 16 and 17 through the medium of suitable bolts 21. Extending transversely across the device between the end wall 11 and the end walls 16 and 17 at the lower end of the device are suitable brackets 22 and 23.

Mounted adjacent the upper end of the device and journaled so as to extend between the end wall 11 and the end walls 16 and 17 are shafts 24 and 25. Mounted on the shafts 24 and 25 so as to be rotatable therewith are rollers 26 and 27 which are disposed in such a position that portions of their peripheries are arranged in abutting relation as clearly illustrated in Figures 4 and 5. The ends of the rollers 26 and 27 disposed toward the slot 18 are arranged so as to be substantially conical in form and the apices of these conical portions, which are indicated by 28 and 29 in the drawings, are disposed toward the slot 18. In Fig. 7 I have illustrated the preferred form of support for the rollers 26 and 27. Referring to this view it may be seen that the end of the shaft 24 is rotatably journaled in a suitable block 30 which is slidably mounted between guide blocks such as 31 that are attached to the adjacent end wall. At the rear end of the block 30 a lug 32 is provided. Extending outwardly from the end wall is a rib 33 in which a bolt 34 is screw-threadedly mounted. A lock nut 35 is mounted on the bolt 34 in a position such that it engages the rib 33 and serves to lock the bolt 34 against unauthorized rotation. A suitable coil spring 36 extends between the nut 35, around the portion of the bolt 34 extending beyond the nut 35, and the lug 32 and this coil spring is indicated by 36 in the drawings. Each of the ends of the shafts 24 and 25 is mounted in the above mentioned manner and therefore the springs 36 to urge the peripheries of the rollers 26 and 27 into engagement at all times.

Mounted at substantially the mid point in a vertical extent of the device are two shafts 37 and 38 which are mounted in a manner substantially similar to the mounting of shafts 24 and 25. Rollers 39 and 40 are mounted on the shafts 37 and 38 and have the peripheries thereof held in engagement in the same manner as the peripheries of the rollers 26 and 27 are held in engagement.

Mounted at the lower end of the device and carried by the brackets 22 and 23 are brackets 41 and 42. A suitable rod 43 extends between the brackets 41 carried by the member 22. A suitable roller 44 is disposed around the rod 43 and is locked in position by means of the nuts 46 (Fig. 6) which engages the screw-threaded ends of the rod 43 so as to lock the roller 44 in position. A roller 47 is similarly supported by the brackets 42 and these two rollers are disposed so as to have their peripheries in substantially abutting relation.

As has been stated this device is adapted to act to clean the fat and other substances from beef intestines in order that the same may be used as sausage casings. As is well understood these intestines are each substantially of equal length. Therefore, when it is desired to clean one of such intestines the operator of the device grips the intestine adjacent one end with one hand and with the other hand grips the intestine in spaced relation with respect to the end held and by placing this portion between the hands under tension the same may be flattened and passed through the slot 18 into position between the conical end portions 28 and 29 of the rollers 26 and 27 and the conical end portions of the rollers 39 and 40 and as these rollers are rotated, in a manner hereinafter set forth, the intestine is caused to pass through the machine wherein it is cleaned in a manner now to be set forth. It is to be understood that when the intestine is positioned in the machine in a manner hereintofore set forth the major portion of the length thereof extends below the rollers 44 and 47 and due to the hereintofore set forth rotation of the rollers 26 and 27 and 39 and 40 this portion of the intestine is caused to pass through the machine. A discharge trough 48 extends between the end wall 17 and the end wall 11 and end of the intestine passed from the rollers 26 and 27 is directed out over this trough and it is apparent that the intestine passed out over this trough will have been cleaned and is therefore ready for usage.

Fixedly journaled in the end walls 11 and 16 is a shaft 49 which is disposed below the roller 39. Transversely aligned with the shaft 49 is a shaft 50 which is fixedly journalled in the end walls 11 and 17. Mounted on the shafts 49 and 50 are substantially square members 51 and 52. The shafts 49 and 50 are adapted to be rotated in a manner to be set forth hereinafter and this rotation is in the direction of the arrows on Fig. 5. It is therefore apparent that the knife blades 53, removably mounted at the corners of the square members 51 and 52, and are successfully brought into engagement with the sausage casing extending between the rollers 44 and 47 and 39 and 40. As is best illustrated in Fig. 3, the square members 51 and 52 are held in longitudinal position upon the shafts 51 and 52 by suitable collars 54 and 55. As also clearly illustrated in Fig. 3 edges of the knife blades 53 are serrated, the utility of which will be made apparent presently. Fixedly journaled in suitable bearings such as 56 and 57 (Fig. 3) is a shaft 59 which is disposed between the shafts 25 and 38 and which extends between the end walls 11 and 17. A shaft 60 is similarly carried between the shafts 24 and 37 and this shaft extends between the end walls 11 and 16. Mounted on the shafts 59 and 60 are ribbed members 61 and 62. The ribs on these members extend angularly thereacross with respect to the lateral extent thereof and these rib members are arranged at substantially 90 degree angles with respect to each other. The members 61 and 62 are adapted to turn toward each other as indicated by the arrows in Fig. 5 and at co-operating points on each of the ribs on each of the members suitable cutting blades 63 are removably mounted.

Disposed to extend across the device adjacent the slot 18 and on each side of the member 62 are pipes 64 and these pipes extend substantially between the end walls 16 and 11 and similarly pipes 65 extend between the end walls 17 and 11 on each side of the member 61. These pipes 64 and 65 are perforated so that they will direct streams of water supplied to these pipes from the main supply pipe 66 (Fig. 2) to the place at which the blades 63 meet the casing extending between the rollers 26 and 27 and 39 and 40.

Each of the shafts 24, 25, 60, 59, 37, 38, 49, and 50 extend through the end wall 11. Mounted on the portions of the shafts 24 and 25 extending through the end wall 11 are gears 67 and 68. A shaft 69 extends across the end wall 11 and is journalled in suitable bearings 70 carried thereby. A main drive shaft 71 extends vertically along the end wall 11 and is journaled in suitable bearings 72. Suitable driving means such as the electric motor 73 is mounted on the shelf 74 carried by the end wall 11. The shaft 75 of this motor is elongated and is journaled in a bearing 76. On the lower end of the shaft 71 a bevel-gear 77 is fixed which meshes with the bevel-gear 78 carried on the end of the motor shaft 75 and therefore movement of the motor 73 is imparted to the shaft 71. A bevel-gear 79 is fixed on the upper end of the shaft 71 and meshes with the bevel-gear 80 on the end of the shaft 69 and therefore movement is imparted to the shaft 69 and worm-gears 81 and 82 thereon serve to drive the gears 67 and 68 which in turn drive the shafts 24 and 25 in opposite directions indicated by the arrows in Fig. 5.

A shaft 83 is journaled in bearings 84 and has a bevel-gear 85 mounted thereon that meshes with a bevel-gear 86 on the shaft 71. Therefore movement of the shaft 71 is imparted to the shaft 83 and worm-gears 87 and 88 that mesh with the gears 89 and 90 on the shafts 37 and 38. Thus these shafts are rotated in opposite directions in the direction of the arrows shown in Fig. 5. It is manifest that the shafts 24 and 37 and 25 and 38 rotate so that the rollers carried by these shafts will cause the sausage casing clamped therebetween to travel in an upward direction.

A shaft 91 is journaled in bearings 92 and has a bevel-gear 93 thereon which meshes with the bevel-gear 94 carried on the shaft 71 and thus movement of the shaft 71 is transmitted to the shaft 91. Bevel-gears 95 and 96 are mounted on the shaft 91 and these bevel-gears mesh with bevel-gears 97 and 98 carried on the shafts 59 and 60 and thus movement of the shaft 91 is transmitted through these meshing bevel-gears to the shafts 59 and 60 which causes these shafts to rotate in the direction of the arrows shown on Fig. 5 and it is apparent that the gears are disposed such that the shafts rotate in opposite directions. Rotation of these shafts is such that cutting blades 63 are brought into cutting relation with respect of the intestine extending between the rollers 26 and 27 and 39 and 40. It is apparent that streams of hot water will be emitted through the perforations in the pipes 64 and 65 and in view of the fact that the intestine will be squeezed as it is passed between the rollers 39 and 40 it is apparent that the blades 63 will very effectively cut the fat from the intestine.

A shaft 99 is journaled in bearings 100 and a bevel-gear 101 is provided on this shaft which meshes with a bevel-gear 102 carried by the shaft 71 and thus movement of the shaft 71 is transmitted to the shaft 99. Bevel-gears 103 and 104 are provided on the shaft 99 and these bevel-gears mesh with bevel-gears 105 and 106 carried on the shafts 49 and 50 and thus movement is imparted through these meshing bevel-gears from the shaft 99 to the shafts 49 and 50 and therefore the members 51 and 52 carrying the serrated cutting blades 53 are moved such that the blades 53 are brought into co-operating relation with the intestine extending between the rollers 39 and 40 and 44 and 47 and these serrated cutting blades serve to scrape fat from the intestine.

It is apparent in the foregoing description that I have provided a device into which an intestine may be expeditiously inserted. I have arranged this machine in such a manner that a portion of the fat will be scraped from the intestine and then the intestine will be squeezed or compressed and then subjected to streams of hot water and a cutting action so that all of the fat may be removed therefrom and I have arranged the device so that the intestine will then be given a final squeeze or compression and then be delivered ready for usage. It is apparent that the portion of the intestine first inserted into the machine will not be effectively cleaned and therefore after an intestine has once been passed through the machine it is preferable that it be reversed and passed through the machine in the opposite direction so as to effectively remove all of the fat therefrom and especially from the end which was first inserted in the machine.

It is also apparent from the foregoing that the device is arranged such that the rollers which act to compress the intestine and which also serve to pull the intestine through the machine are arranged such that they travel in a direction as to cause the intestine to travel from the bottom to the top of the machine. It is also apparent from the foregoing description that the members which carry the blade members which act therefrom are operated so that they revolve in a direction toward the lower part of the machine or in other words the feeding rollers travel in one direction while the cutting rollers operate in the opposite direction.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variation and modifications as come within the scope of the appended claims.

Having thus described my invention what I claim is new and desire to protect by Letters Patent is:

1. A device of the class described including a supporting structure, a pair of rotatably mounted shafts adjacent the upper end of said supporting structure having rollers mounted thereon, means for forcing said rollers toward each other whereby to yieldingly hold the peripheries of said rollers in engagement, another pair of rollers mounted in said supporting structure below said first named pair of rollers and aligned therewith, means for supporting said second named pair of rollers, means for forcing said rollers toward each other to yieldingly hold the peripheries of said rollers in engagement, and rotary members disposed between said first named pair and said second named pair of rollers having cutting members thereon disposed to act on a member stretched between said first named pair and said second named pair of rollers, and an additional pair of rotary members mounted below said second named pair of rollers having scraping elements provided thereon, said scraping elements acting on the member being drawn through said supporting structure by said first and second named pairs of rollers.

2. A device of the class described including a supporting structure, a pair of rotatably mounted shafts adjacent the upper end of said supporting structure having rollers mounted thereon, means for forcing said rollers toward each other whereby to yieldingly hold the peripheries of said rollers in engagement, another pair of rollers mounted in said supporting structure below said first named pair of rollers and to be aligned therewith, means for supporting said second named pair of rollers, means for forcing said rollers toward each other to yieldingly hold the peripheries of said rollers in engagement, and rotary members disposed between said first named pair and said second named pair of rollers having cutting members thereon disposed to act on a member stretched between said first named pair and said second named pair of rollers, and an additional pair of rotary members mounted below said second named pair of rollers having scraping elements provided thereon, said scraping elements acting on the member being drawn through said supporting structure by said first and second named pairs of rollers, and a pair of guiding rollers mounted below said last named pair of rollers for directing said material to said second named pair of rollers between said members having said scraping elements thereon.

3. A device of the class described including a supporting structure, said supporting structure having a longitudinal slot formed in one wall thereof, means for supporting pairs of rollers in position such that the peripheries of said rollers engage each other in alignment with said slot, said rollers having conical end portions on the ends thereof disposed towards said slot, means for rotating said pairs of rollers whereby when a strip of material is passed through said slot past the conical end portions of said rollers said material will be clamped between said rollers so as to be drawn through said supporting structure.

4. A device of the class described including a supporting structure, said supporting structure having a longitudinal slot formed in one wall thereof, means for supporting pairs of rollers in position such that the peripheries of said rollers engage each other in alignment with said slot, said rollers having conical end portions on the ends thereof disposed towards said slot, means for rotating said pairs of rollers whereby when a strip of material is passed through said slot past the conical end portions of said rollers said material will be clamped between said rollers so as to be drawn through said supporting structure, and means disposed below one of said pairs of rollers for scraping the surface of said material being drawn through said supporting structure.

5. A device of the class described including a supporting structure, said supporting structure having a longitudinal slot formed in one wall thereof, means for supporting pairs of rollers in position such that the peripheries of said rollers engage each other in alignment with said slot, said rollers having conical end portions on the ends thereof disposed towards said slot, means for rotating said pairs of rollers whereby when a strip of material is passed through said slot past the conical end portions of said rollers said material will be clamped between said rollers so as to be drawn through said supporting structure, and means disposed below one of said pairs of rollers for scraping the surface of said material being drawn through said supporting structure, and means disposed between said pairs of rollers for cutting material from the surface of said material passing through said supporting structure.

6. A device of the class described including a supporting structure, said supporting structure having a longitudinal slot formed in one wall thereof, means for supporting pairs of rollers in position such that the peripheries of said rollers engage each other in alignment with said slot, said rollers having conical end portions on the ends thereof disposed toward said slot, means for rotating said pairs of rollers whereby when a strip of material is passed through said slot past the conical end portions of said rollers said material will be clamped between said rollers so as to be drawn through said supporting structure, means disposed below one of said pairs of rollers for scraping the surface of said material being drawn through said supporting structure, and another pair of rollers mounted in said frame below said scraping means for guiding the material to said scraping means.

7. A device of the class described including a supporting structure, said supporting structure having a longitudinal slot formed in one wall thereof, means for supporting pairs of rollers in position such the peripheries of said rollers engage each other in alignment with said slot, said rollers having conical end portions on the ends thereof disposed towards said slot, means for rotating said pairs of rollers whereby when a strip of material is passed through said slot past the conical end portions of said rollers said material will be clamped between said rollers so as to be drawn through said supporting structure, means disposed below one of said pairs of rollers for scraping the surface of said material being drawn through said supporting structure, means disposed between said pairs of rollers for cutting material from the surface of said material passing through said supporting structure, and another pair of rollers mounted in said frame below said scraping means for guiding the material to said scraping means.

8. A device of the class described including a supporting structure, said supporting structure having a longitudinal slot formed in one wall thereof, means for supporting pairs of rollers in position such that the peripheries of said rollers engage each other in alignment with said slot, said rollers having conical end portions on the ends thereof disposed toward said slot, means for rotating said pairs of rollers whereby when a strip of material is passed through said slot past the conical end portions of said rollers said material will be clamped between said rollers so as to be drawn through said supporting structure, means disposed below one of said pairs of rollers for scraping the surface of said material being drawn through said supporting structure, and means disposed between said pairs of rollers for directing a heated liquid onto the material extending therebetween.

9. A device of the class described including a supporting structure, said supporting structure having a longitudinal slot formed in one wall thereof, means for supporting pairs of rollers in position such that the peripheries of said rollers engage each other in alignment with said slot, said rollers having conical end portions on the ends thereof disposed towards said slot, means for rotating said pairs of rollers whereby when a strip of material is passed through said slot past the conical end portions of said rollers said material will be clamped betwen said rollers so as to be drawn through said supporting structure, means disposed below one of said pairs of rollers for scraping the surface of said material being drawn through said supporting structure, means disposed between said pairs of rollers for cutting material from the surface of said material passing through said supporting structure, and means disposed on each side of said cutting means for directing a heated liquid against the material being acted on by said cutting means.

In testimony whereof I affix my signature.

JOSEPH S. KROB.